Figure 1:
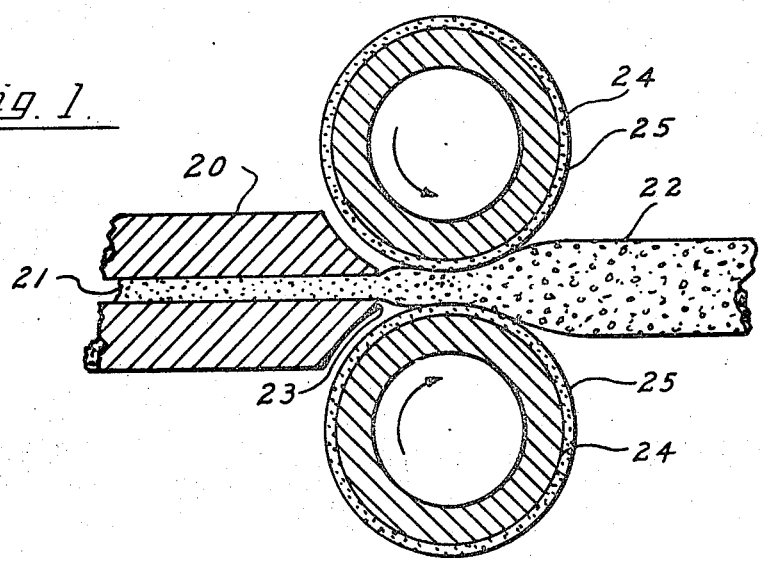

July 19, 1960   A. A. AYKANIAN ET AL   2,945,261
PREPARATION OF FOAMED THERMOPLASTIC RESIN FORMS
HAVING WRINKLE-FREE PROFILE SURFACES
Filed May 31, 1956

ARDASHUS A. AYKANIAN
FRANK A. CARLSON, Jr. INVENTORS.

BY *Richard K. Kelly*
ATTORNEY.

United States Patent Office 2,945,261
Patented July 19, 1960

2,945,261

PREPARATION OF FOAMED THERMOPLASTIC RESIN FORMS HAVING WRINKLE-FREE PROFILE SURFACES

Ardashus A. Aykanian, Indian Orchard, and Frank A. Carlson, Jr., Springfield, Mass., assignors to Monsanto Chemical Company, St. Louis, Mo., a corporation of Delaware Filed May 31, 1956, Ser. No. 588,377

6 Claims. (Cl. 18—48)

This invention relates to methods for preparing foamed thermoplastic resin forms having smooth, wrinkle-free profile surfaces and apparatus for use in carrying out said methods.

In our copending application, Serial No. 538,837, filed October 6, 1955, and now abandoned we disclose a process for preparing foamed thermoplastic resin forms having smooth, wrinkle-free profile surfaces. In this method a foamable thermoplastic resin composition is extruded directly into a cooled forming die adapted to apply pressure on the profile of the extruded form, said forming die being defined by a plurality of surfaces which are driven in the direction of extrusion. When the foamed thermoplastic resin is fabricated into a sheet, the forming die may constitute a pair of driven cooling rolls. The distance between the extruder die orifice and the forming die is kept as short as possible so that the extruded thermoplastic resin contacts the forming die before it is foamed into a wrinkled, corrugated mass. Stated positively, the distance between the extruder die orifice and the forming die must be sufficiently short that when the extruded foamed thermoplastic resin contacts the forming die its profile is substantially a uniform expansion of the profile of the extruder die orifice. This method is especially adapted to the production of foamed thermoplastic resin sheets.

In operating the above noted process with metal forming dies, it has been necessary to maintain the surface temperatures of the forming die below about 140° F. While foamed thermoplastic resin forms of excellent quality are produced by the subject process, the density of the resulting product is frequently higher than desired. Consequently, it would be desirable to have a process for preparing high quality foamed thermoplastic resin forms which have lower densities than can be obtained by the process of our above noted copending application.

It is an object of this invention to provide a method for preparing foamed thermoplastic resin forms having smooth, wrinkle-free profile surfaces.

Another object of this invention is to provide a process for preparing foamed thermoplastic resin forms having smooth, wrinkle-free profile surfaces and low densities.

A further object of this invention is to provide novel apparatus for preparing such foamed thermoplastic resin forms.

These and other objects and advantages of this invention will become apparent from the following detailed description thereof when read in conjunction with the attached drawings in which—

Figure 2:
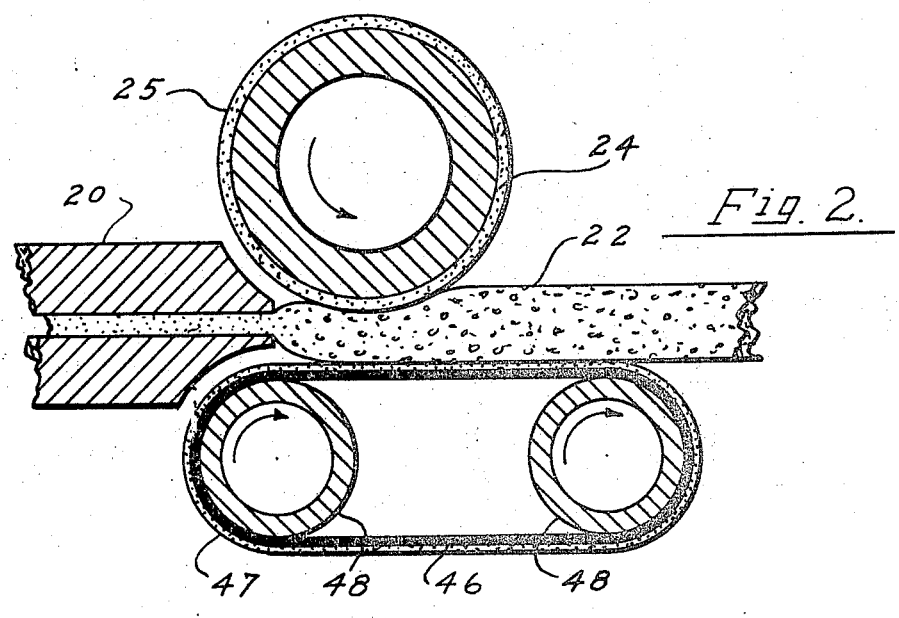

Fig. 1 is a schematic side view of one embodiment of the invention in which a foamed thermoplastic resin is extruded in the form of a sheet, and Fig. 2 is a modification of the embodiment illustrated in Fig. 1.

We have now discovered a novel process for preparing foamed thermoplastic resin forms having smooth, wrinkle-free profile surfaces and desirable low densities. Operational-wise, our new process is identical with that of our earlier discussed copending application Serial No. 538,837 except that the resin contacting surfaces of the forming die carry a coating of a polymer of the group consisting of chlorotrifluoroethylene, tetrafluoroethylene and mixtures thereof. Surprisingly, when the resin contacting surfaces of the forming die carry a coating of a polymer of either chlorotrifluoroethylene or tetrafluoroethylene, the process may be operated at forming die surface temperatures considerably above 140° C. without operational difficulties. By operating at such higher forming die surface temperatures, the foamed thermoplastic resin forms that are obtained have desirable low densities.

In the embodiment illustrated in Fig. 1, a foamable thermoplastic resin composition, e.g., polystyrene containing 1–15% pentane, is delivered by an extruder (not shown) into an extruder die 20 in a fluid state above its melting point, but foaming within the extruder and extruder die is suppressed by maintaining the plastic mass under a pressure of the order of 100–150 p.s.i. When the plastic mass is extruded in sheet form through orifice 23 of channel 21, the sudden pressure drop (extruder pressure to atmospheric pressure) causes rapid foaming of sheet 22. Orifice 23 is positioned very close to the nip of rolls 24 and sheet 22 contacts the rolls before it has foamed itself into a corrugated sheet. Each of the rolls 24 carries a thin coating 25 (thickness exaggerated in the drawing) of a homopolymer of tetrafluoroethylene. In passing through the nip of the rolls, the expansion of the resin forces the surfaces of sheet 22 into pressured engagement with rolls 24 thereby providing smooth, wrinkle-free surfaces on the sheet. The surfaces of rolls 24 are maintained at a desired preset temperature, e.g. about 180° F., by circulating a heat exchange liquid through the rolls.

Fig. 2 illustrates a modification of the embodiment of Fig. 1 in which sheet 22 is extruded onto a short endless belt 46 which is driven by rolls 48 in cooperative relationship with roll 24. The coating 25 on roll 24 and the coating 47 on belt 46 is a homopolymer of tetrafluoroethylene. In all other respects the embodiment of Fig. 2 is identical with that illustrated in Fig. 1.

The following example is set forth to illustrate more clearly the principle and practice of this invention to those skilled in the art.

EXAMPLE I

Part A

A flat sheet of foamed polystyrene is prepared in an apparatus of the type illustrated in Fig. 1. The extruder die orifice is 0.04 inch high and 6.8 inches wide. The die rolls are 3 inches in diameter and 16 inches long and their surfaces carry a one mil thick coating of a homopolymer of tetrafluoroethylene. The opening between the cooling rolls is 0.09 inch and the distance between the center line of the cooling rolls and the face of the extruder die orifice is 0.8 inch. The surface temperature of the cooling rolls is maintained at 180° F. by circulating cooling water through the rolls. The rolls are rotated at a peripheral speed of 4.5 feet per minute and polystyrene containing 7% pentane is extruded into the nip of the cooling rolls at an extrusion temperature of 300° F. A smooth flat sheet of foamed polystyrene is obtained which has a density of 4 pounds per cubic foot.

Part B

Part A above is repeated except that the cooling rolls are replaced with chrome-plated rolls of the same size and the surface temperatures thereof are maintained at 130° F. A flat sheet of polystyrene foam is obtained which has a density of 6 pounds per cubic foot.

A critical feature of the present invention is the distance set between the extruder die orifice and the forming die. This distance must be sufficiently short so that the extruded thermoplastic resin form contacts the forming die before it has been foamed into a wrinkled corrugated mass. Stated positively, the distance must be sufficiently short so that when the extruded thermoplastic resin form contacts the forming die its profile is substantially a uniform expansion of the profile of the extruder die orifice. By operating in this manner the forming die cools the surface of the extruded form while foaming within the interior of the extruded form forces the surfaces thereof into pressured contact with the forming die so as to form smooth, substantially wrinkle-free surfaces.

The precise distance within which the extruder die orifice and the forming die must be set is influenced by such a multiplicity of factors that it is not possible to state the distance with mathematical preciseness unless all the parameters of the extrusion system are first specified. To indicate the order of magnitude to be employed, however, it may be noted that in preparing a 0.25 inch thick sheet by extruding the foamable resin into the nip of a pair of cooling rolls of 3-inch diameter, the extruder die orifice should be set within 2 inches of the nip of the rolls and optimum results are obtained when the extruder die orifice is set within 1 inch of the nip of the rolls.

The principal factor which influences the distance within which the extruder die orifice and the forming die must be set is the temperature employed in extruding the foamable thermoplastic resin composition. As the extrusion temperature is increased, the rate of foaming is accelerated and the characteristic wrinkling of the extruded forms occurs closer to the extruder die orifice. Consequently, as the extrusion temperature is increased, the extruder die orifice must be moved closer to the forming die. For this reason, it is desirable to operate the extruder at the lowest feasible temperature at which the foamable thermoplastic resin composition can be extruded to give a foam of the desired density.

Another factor affecting the distance within which the extruder die orifice and the forming die must be set is the nature of the foamable thermoplastic resin composition employed. For example, when a thermoplastic resin composition is extruded at a fixed temperature, the degree and rapidity of foaming is a function of the concentration of the foaming agent incorporated in the thermoplastic composition. Consequently, as the percentage of foaming agent in the thermoplastic composition increases, the distance between the extruder die orifice and the forming die should be shortened. Since to a degree, at least, the minimum extrusion temperature that can be employed is a function of the viscosity of thermoplastic resin being extruded, lowering the molecular weight of the thermoplastic resin (which will lower its viscosity) will have the effect of lowering the minimum extrusion temperature that can be employed. By making possible a lower extrusion temperature, lowering of the molecular weight of the thermoplastic resin will permit a greater latitude in setting the distance between the extruder die orifice and the forming die.

Another critical feature of the invention is that the resin contacting surfaces of the forming die must be cooled below the temperature of the extruded thermoplastic resin. Where a maximum density foamed thermoplastic resin foam is desired, however, the resin contacting surfaces of the forming die should be cooled only to the extent necessary to prevent the profile surfaces of the extruded form from becoming wrinkled. The maximum cooling surface temperature that can be employed is influenced by such a multitude of factors, e.g., the nature of the foamable thermoplastic resin composition being extruded, the rate at which the thermoplastic resin composition is being extruded into the forming die, the heat transfer characteristics of the cooling surfaces, etc., that it is not possible to state precisely what cooling surface temperature should be employed until the other parameters of the system are fixed. Under most circumstances, it is usually necessary to maintain the resin contacting surfaces of the forming die about 100° F. below the temperature at which the fomable thermoplastic resin composition is extruded. For example, employing the apparatus described in Example I, good results have been obtained in extruding foamed polystyrene at 300° F. while maintaining the surfaces of the forming die at 180–200° F. The foaming die surface temperatures should be maintained above 140° F. to obtain low density foams.

The resin contacting surfaces of the forming die are coated with a polymer of either chlorotrifluoroethylene or tetrafluoroethylene. Preferably, such polymers should be homopolymers, but in some cases it is possible to employ interpolymers of such fluorinated monomers, provided that the fluorinated monomer constitutes a predominant proportion, i.e., greater than 50% of the interpolymer.

The foamable thermoplastic resin compositions that may be fabricated by the process of the present invention consist of a thermoplastic resin and a suitable foaming or pore-forming agent. Examples of the thermoplastic resins that may be employed include cellulose ethers and esters, e.g., ethyl cellulose, cellulose acetate; homopolymers and interpolymers of monomeric compounds containing the vinylidene $CH_2=C<$ grouping such as olefins, e.g., ethylene, isobutylene; vinyl halides, e.g., vinyl chloride; vinylidene chloride; vinyl esters of carboxylic acids, e.g., vinyl acetate, vinyl propionate, vinyl butyrate, vinyl benzoate; vinyl ethers, e.g., vinyl methyl ether, vinyl ethyl ether, vinyl isobutyl ether; vinylidene aromatic compounds, e.g., styrene, vinyl toluene; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with unsaturated alpha,beta-polycarboxylic acid and derivatives thereof, e.g., maleic anhydride, diethyl maleate, dibutyl fumarate, diallyl maleate, dipropyl maleate, etc. In general, optimum results are obtained with rigid, relatively non-elastic thermoplastic resins such as homopolymers and interpolymers of vinyl chloride, homopolymers of vinylidene aromatic compounds, e.g., styrene, o-chlorostyrene, p-chlorostyrene, 2,5 dichlorostyrene, 2,4 dichlorostyrene, p-methylstyrene, p-ethylstyrene, vinyl naphthalene, alpha-methylstyrene, and interpolymers of such vinyl aromatic compounds containing at least 70% of the vinylidene aromatic compound. It is feasible and sometimes desirable to employ a blend of two or more thermoplastic resins such as a blend of polystyrene and a rubbery diene polymer such as natural rubber, butadiene-acrylonitrile rubbers, and the like. High impact polystyrene prepared by polymerizing monomeric styrene in the presence of a rubbery diene polymer also may be employed advantageously.

Suitable foaming agents for the thermoplastic resins are well-known and the selection of the particular foaming agent to be employed will be dictated largely by the particular thermoplastic resin in which it is to be incorporated. It is preferred to employ as foaming agents nonreactive organic liquids which have not more than a slight solvent action on the thermoplastic resin and which volatilize below the softening point of thermoplastic resins. Examples of suitable foaming agents that may be employed with polystyrene include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, and diisopropyl ether.

Coloring agents, pigments, light and heat stabilizers, lubricants, and other conventional plastic compounding agents may be included in the foamable thermoplastic resin compositions.

The invention is not limited to the preparation of wrinkle-free sheets, but is equally well-adapted to the preparation of foamed thermoplastic resin forms having diverse physical shapes. For example, by cutting a triangular groove in one of a pair of cooling rolls it is possible to obtain the foamed thermoplastic resin in the form of a triangular rod. Similarly, by cutting a square groove in one of the rolls, the foamed thermoplastic resin is obtained in the form of a bar. For forming dies adapted to the preparation of foamed thermoplastic resin forms of diverse shapes see our copending application Serial No. 538,837.

The above descriptions and particularly the examples are set forth by way of illustration only. It will be obvious to those skilled in the art that many variations and modifications thereof can be made without departing from the spirit and scope of the invention herein described.

What is claimed is:

1. A method for preparing continuous foamed thermoplastic resin forms having smooth, substantially wrinkle-free profile surfaces which comprises extruding a foamable thermoplastic resin composition through an orifice into a forming die adapted to apply pressure on the profile of the extruded form, said forming die being defined by a plurality of surfaces which are driven in the direction of extrusion, the resin foam contacting surfaces of said forming die carrying a coating of a polymer of the group consisting of chlorotrifluoroethylene, tetrafluoroethylene and mixtures thereof; the extrusion temperature of the foamable thermoplastic resin composition being sufficiently high to expand the extruded form beyond the profile limits of the forming die, the resin foam contacting surfaces of the forming die being maintained between 140° F. and about 180° F. and the distance between the face of the extruder die orifice and the forming die being sufficiently short so that when the extruded thermoplastic resin form contacts the forming die its profile is substantially a uniform expansion of the profile of the extruder die orifice; said foamable thermoplastic resin composition comprising a thermoplastic resin and, as a foaming agent, a non-reactive organic liquid which has not more than a slight solvent action on the thermoplastic resin and which boils below the softening point of the thermoplastic resin.

2. A method for preparing a smooth, substantially wrinkle-free continuous sheet of foamed thermoplastic resin which comprises extruding a sheet of foamable thermoplastic resin composition through an orifice into a forming die adapted to apply pressure on the extruded sheet, said forming die being defined by a plurality of surfaces which are driven in the direction of extrusion, the resin foam contacting surfaces of said forming die carrying a coating of a polymer of the group consisting of chlorotrifluoroethylene, tetrafluoroethylene and mixtures thereof; the extrusion temperature of the foamable thermoplastic resin composition being sufficiently high to expand the extruded sheet beyond the profile limits of the forming die, the resin foam contacting surfaces of the forming die being maintained between 140° F. and about 180° F. and the distance between the face of the extruder die orifice and the forming die being less than 2 inches and sufficiently short so that when the extruded thermoplastic resin sheet contacts the forming die its profile is substantially a uniform expansion of the profile of the extruder die orifice; said foamable thermoplastic resin composition comprising a thermoplastic resin and, as a foaming agent, a non-reactive organic liquid which has not more than a slight solvent action on the thermoplastic resin and which boils below the softening point of the thermoplastic resin.

3. A method for preparing a smooth, substantially wrinkle-free continuous sheet of foamed thermoplastic resin which comprises extruding a sheet of foamable thermoplastic resin composition into the nip of a pair of oppositely rotating rolls, said rolls being driven in the direction of extrusion, the resin foam contacting surfaces of said rolls carrying a coating of a polymer of the group consisting of chlorotrifluoroethylene, tetrafluoroethylene and mixtures thereof; the extrusion temperature of the foamable thermoplastic resin composition being sufficiently high to expand the extruded sheet beyond the nip of the rolls, the resin foam contacting surfaces of the rolls being maintained between 140° F. and about 180° F. and the distance between the face of the extruder die orifice and the nip of the cooling rolls being (a) less than 2 inches, (b) less than the radius of the cooling rolls and (c) sufficiently short so that when the extruded thermoplastic resin sheet contacts the cooling rolls its profile is substantially a uniform expansion of the extruder die orifice; said foamable thermoplastic resin composition comprising a thermoplastic resin and, as a foaming agent, a non-reactive organic liquid which has not more than a slight solvent action on the thermoplastic resin and which boils below the softening point of the thermoplastic resin.

4. The method of claim 1 in which the foamable thermoplastic resin composition extruded into the forming die comprises a styrene polymer containing at least 70 weight percent styrene in its structure and, as a foaming agent, a liquid aliphatic hydrocarbon which boils below the softening point of the styrene polymer.

5. The method of claim 2 in which the foamable thermoplastic resin composition extruded into the forming die comprises a styrene polymer containing at least 70 weight percent styrene in its structure and, as a foaming agent, a liquid aliphatic hydrocarbon which boils below the softening point of the styrene polymer.

6. The method of claim 3 in which the foamable thermoplastic resin composition extruded into the forming die comprises a styrene polymer containing at least 70 weight percent styrene in its structure, and as a foaming agent, a liquid aliphatic hydrocarbon which boils below the softening point of the styrene polymer.

References Cited in the file of this patent

UNITED STATES PATENTS

| | | |
|---|---|---|
| 1,661,069 | Hartung | Feb. 28, 1928 |
| 2,354,260 | Haney et al. | July 25, 1944 |
| 2,450,436 | McIntire | Oct. 5, 1948 |
| 2,740,157 | McCurdy et al. | Apr. 3, 1956 |
| 2,774,991 | McCurdy et al. | Dec. 25, 1956 |